US012739545B2

(12) United States Patent
Hsieh et al.

(10) Patent No.: US 12,739,545 B2
(45) Date of Patent: Sep. 15, 2026

(54) HEAD MOUNTED DISPLAY DEVICE AND STRAP MODULE THEREOF

(71) Applicant: HTC Corporation, Taoyuan City (TW)

(72) Inventors: Chih-Hsiang Hsieh, Taoyuan City (TW); Li-Hsun Chang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 145 days.

(21) Appl. No.: 18/969,256

(22) Filed: Dec. 5, 2024

(65) Prior Publication Data

US 2026/0164153 A1 Jun. 11, 2026

(51) Int. Cl.
*H04R 1/02* (2006.01)

(52) U.S. Cl.
CPC ....... *H04R 1/025* (2013.01); *H04R 2201/023* (2013.01)

(58) Field of Classification Search
CPC .......................... H04R 1/025; H04R 2201/023
See application file for complete search history.

(56) References Cited

U.S. PATENT DOCUMENTS

| | | | | |
|---|---|---|---|---|
| 10,108,016 | B2 | 10/2018 | Bosveld et al. | |
| 2020/0296521 | A1* | 9/2020 | Wexler | G03B 31/00 |
| 2021/0235202 | A1* | 7/2021 | Wexler | G03B 31/00 |
| 2023/0380081 | A1* | 11/2023 | Fu | H02J 7/751 |
| 2024/0393601 | A1 | 11/2024 | Smith et al. | |

FOREIGN PATENT DOCUMENTS

| | | |
|---|---|---|
| CN | 109085698 | 12/2018 |
| CN | 116962923 | 10/2023 |
| CN | 117055228 | 11/2023 |

OTHER PUBLICATIONS

"Notice of allowance of Taiwan Counterpart Application", issued on Oct. 16, 2025, p. 1-p. 4.

* cited by examiner

*Primary Examiner* — Suhan Ni
(74) *Attorney, Agent, or Firm* — JCIPRNET

(57) ABSTRACT

A head mounted display device and a strap module thereof are provided. The strap module includes a casing, a first strap, a second strap, a first speaker module, and a second speaker module. The first strap and the second strap are respectively connected to two opposite sides of a host. The first strap and the second strap are at least partially overlapped and accommodated in the casing. The first speaker module and the second speaker module are slidably disposed on slide rails of the casing. The first connecting section of the first strap has a first magnetic portion. The second connecting section of the second strap has a second magnetic portion. When the first connecting section and the second connecting section slide in the casing, the first magnetic portion magnetically attracts a third magnetic portion of the first speaker module to drive the first speaker module to slide on the slide rail, and the second magnetic portion magnetically attracts a fourth magnetic portion of the second speaker module to drive the second speaker module to slide on the slide rail.

10 Claims, 8 Drawing Sheets

HEAD MOUNTED DISPLAY DEVICE AND STRAP MODULE THEREOF

BACKGROUND

Technical Field

The disclosure relates to a display device and a strap module thereof, and more particularly, to a head mounted display device and a strap module thereof.

Description of Related Art

With the rapid advancement of current technology, types and functions of a head mounted device are becoming increasingly diversified. Taking a goggle-type head mounted device as an example, when a user wears such a device, a gyroscope and a position tracker inside the head mounted device will track a movement state of the user to display a corresponding scene image, providing the user with an experience as if he is in a virtual world.

When using the head mounted device, in addition to improving a visual experience, sound effects are also one of key elements that enhance immersion of the user. If a headphone is used for the existing head mounted device to enhance sound and light experiences, a size of the headphone is often too large. If an embedded design is used in a head cradle, it is easy to cause poor fit and comfort due to different head shapes of the users. If a plug-in design is used, there are also differences in ear positions of different users, and a position of the headphone is required be adjusted to obtain better sound effects. Therefore, how to facilitate the user to adjust the position of the headphone is an important issue.

SUMMARY

This disclosure provides a head mounted display device and a strap module thereof, which may improve an issue that a position of a headphone is not easy to adjust.

A head mounted display device in the disclosure includes a host and a strap module. The strap module includes a casing, a first strap, a second strap, a first speaker module, and a second speaker module. The casing has a first slide rail and a second slide rail. The first strap has a first terminal and a first connecting section. The second strap has a second terminal and a second connecting section. The first terminal and the second terminal are respectively connected to two opposite sides of the host. The first connecting section and the second connecting section are at least partially overlapped and accommodated in the casing. The first speaker module is slidably disposed on the first slide rail. The second speaker module is slidably disposed on the second slide rail. The first connecting section has a first magnetic portion. The second connecting section has a second magnetic portion. The first speaker module has a third magnetic portion. The second speaker module has a fourth magnetic portion. When the first connecting section and the second connecting section slide in the casing, the first magnetic portion magnetically attracts the third magnetic portion to drive the first speaker module to slide on the first slide rail, and the second magnetic portion magnetically attracts the fourth magnetic portion to drive the second speaker module to slide on the second slide rail.

A strap module in the disclosure includes a casing, a first strap, a second strap, a first speaker module, and a second speaker module. The casing has a first slide rail and a second slide rail. The first strap has a first terminal and a first connecting section. The second strap has a second terminal and a second connecting section. The first terminal and the second terminal are respectively connected to two opposite sides of a host. The first connecting section and the second connecting section are at least partially overlapped and accommodated in the casing. The first speaker module is slidably disposed on the first slide rail. The second speaker module is slidably disposed on the second slide rail. The first connecting section has a first magnetic portion. The second connecting section has a second magnetic portion. The first speaker module has a third magnetic portion. The second speaker module has a fourth magnetic portion. When the first connecting section and the second connecting section slide in the casing, the first magnetic portion magnetically attracts the third magnetic portion to drive the first speaker module to slide on the first slide rail, and the second magnetic portion magnetically attracts the fourth magnetic portion to drive the second speaker module to slide on the second slide rail.

Based on the above, in the head mounted display device and the strap module thereof in the disclosure, a length adjustment of the strap module and a position adjustment of the speaker module may be completed at one time, which has better convenience.

DETAILED DESCRIPTION OF DISCLOSED EMBODIMENTS

Figure 1:
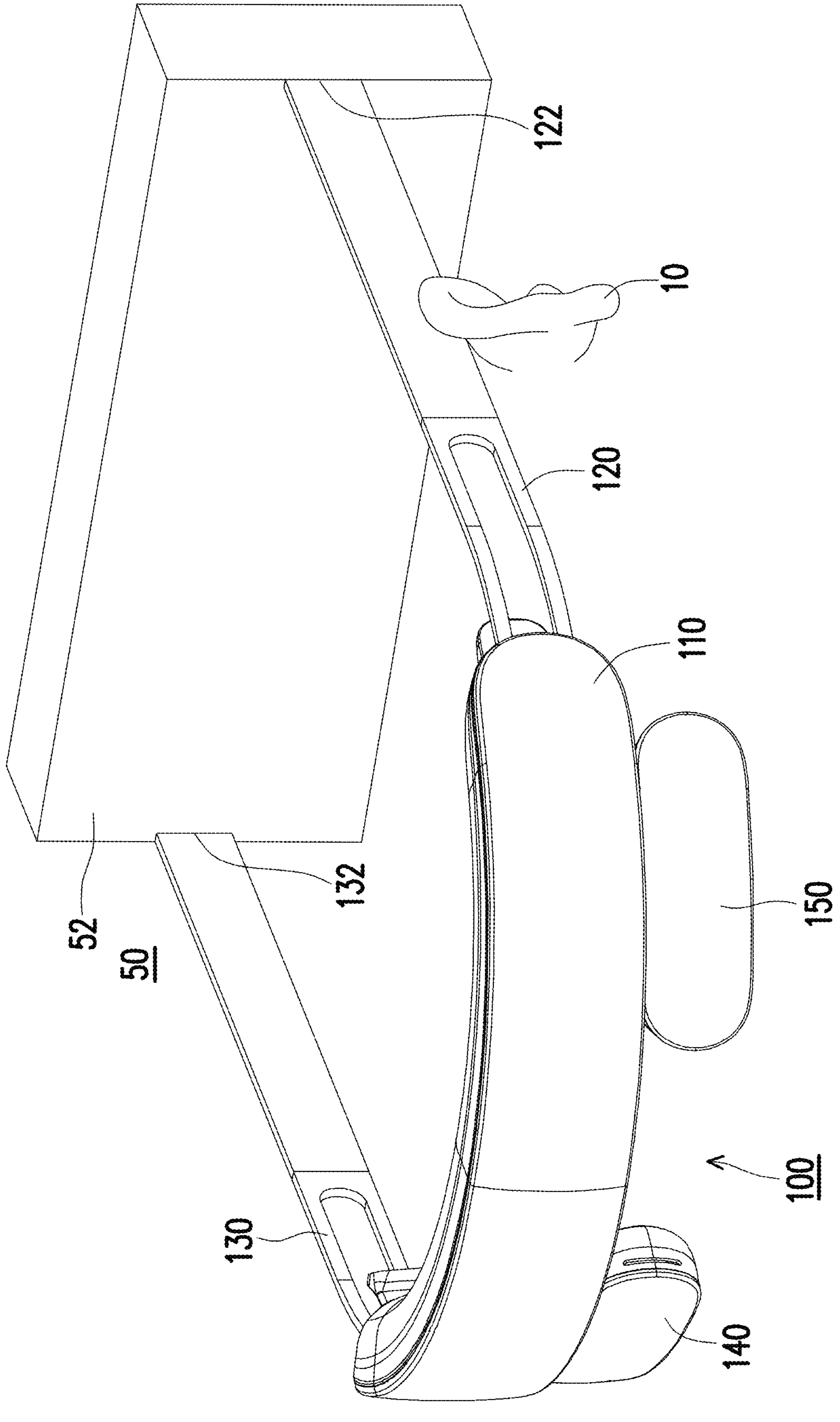
FIG. 1 is a schematic view of a head mounted display device according to an embodiment of the invention.

FIG. 1 is a schematic view of a head mounted display device according to an embodiment of the invention. Referring to FIG. 1, a head mounted display device 50 in this embodiment includes a host 52 and a strap module 100. A length of the strap module 100 is variable. Therefore, the host 52 may be fixed on a head of a user regardless of a head size of the user.

In this embodiment, the host 52 may be applied to fields such as a virtual reality system, an augmented reality system, or a mixed reality system. The host 52 may include components such as an optical system and a protective casing, and may be provided with a display or be suitable for placing the display. The aforementioned display may be a built-in display or an external portable display (e.g., a smart phone, etc.), but the disclosure is not limited thereto. The optical system includes optical elements used to change a light path of the display, such as lenses, light guiding members, or prisms. The host 52 in FIG. 1 is shown in a slightly larger form, but the host 52 may also be in a lightweight form or other forms.

Figure 2:
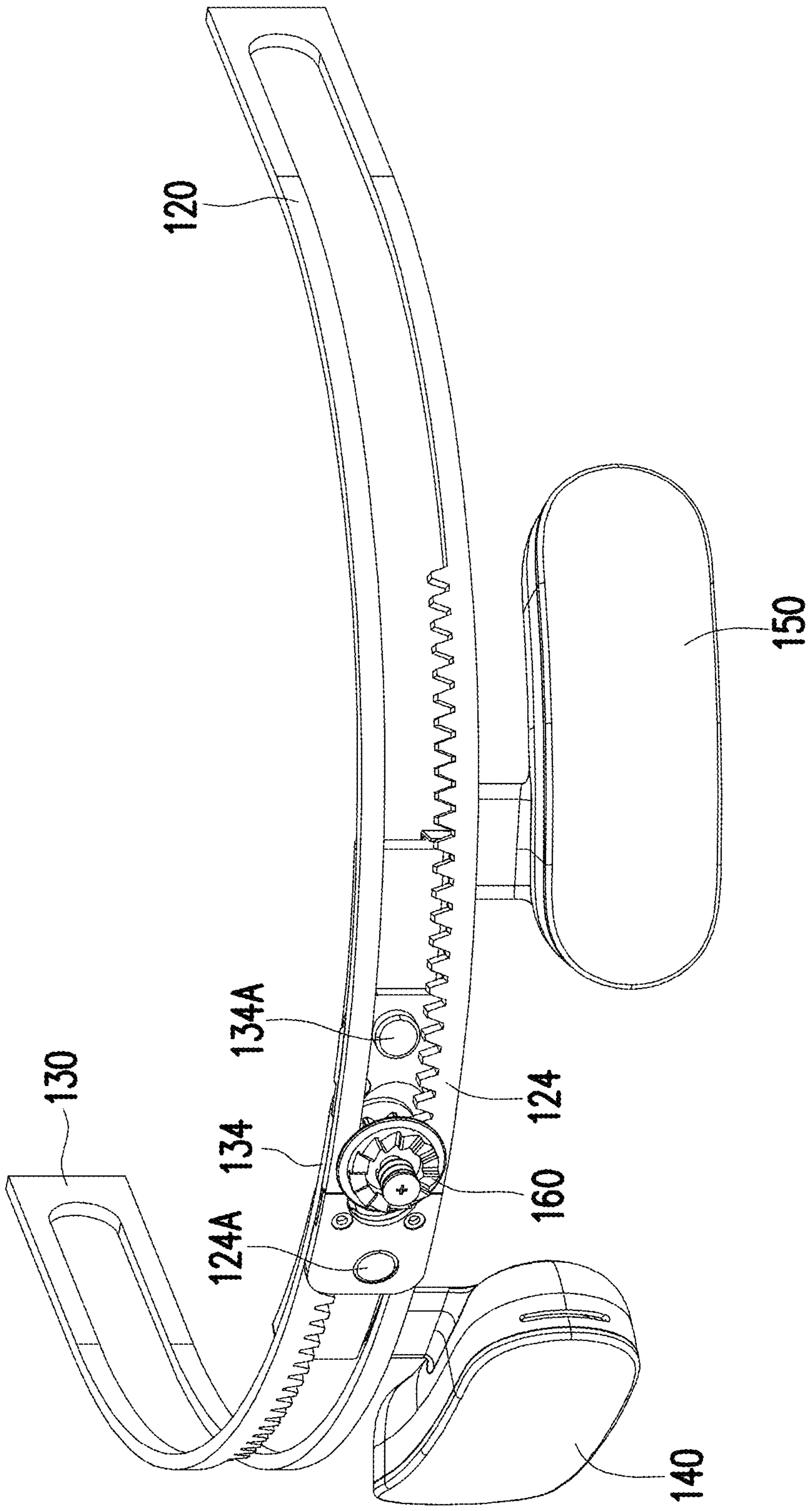
FIG. 2 is a schematic view of some elements of a strap module of the head mounted display device in FIG. 1.
Figure 3:
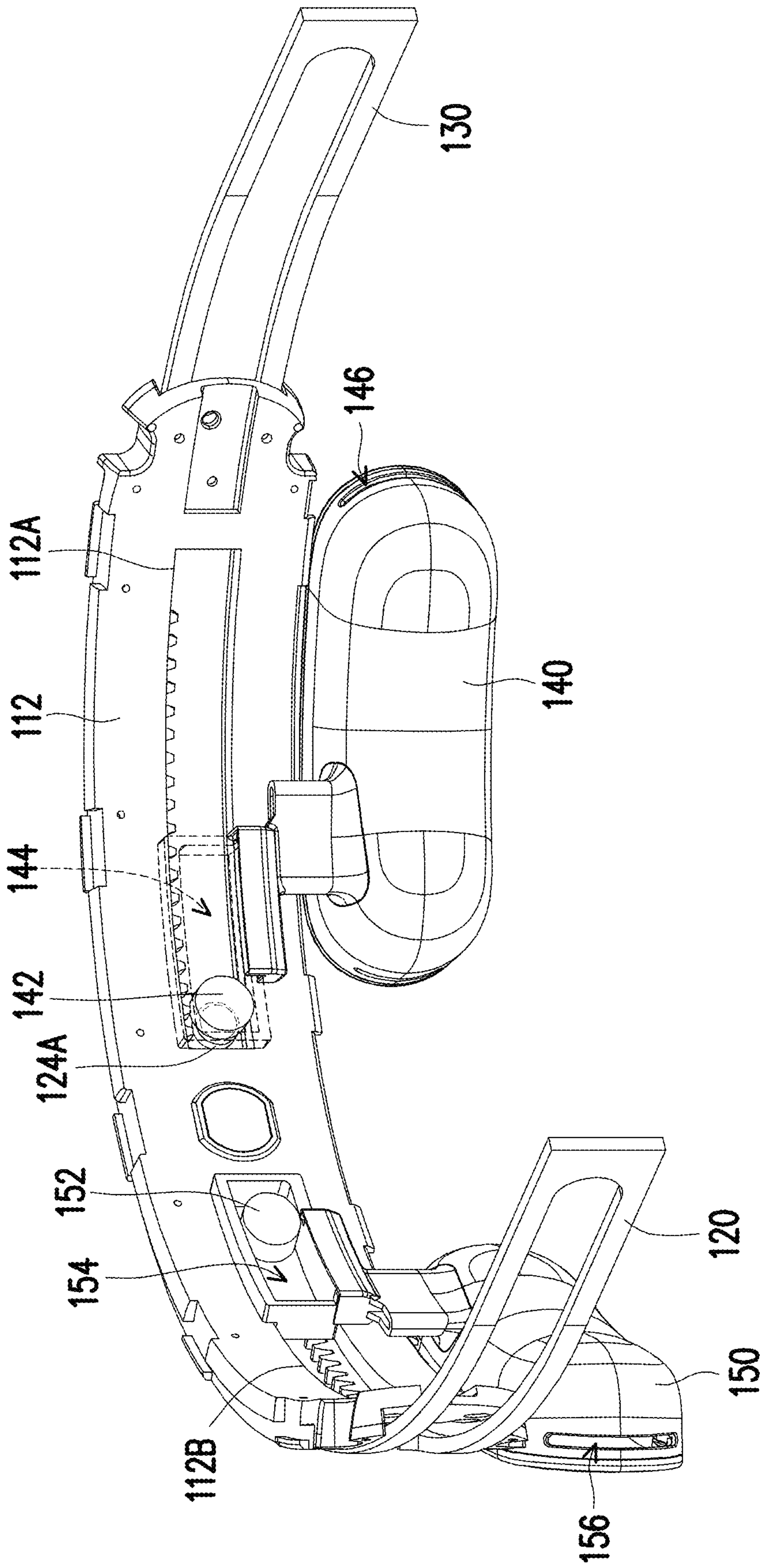
FIG. 3 is a schematic view of the strap module in FIG. 2 with an added element from another perspective.

FIG. 2 is a schematic view of some elements of a strap module of the head mounted display device in FIG. 1. FIG. 3 is a schematic view of the strap module in FIG. 2 with an added element from another perspective. Referring to FIGS. 1 to 3, the strap module 100 in this embodiment includes a casing 110, a first strap 120, a second strap 130, a first speaker module 140, and a second speaker module 150. In addition to providing support for other elements of the strap module 100, the casing 110 is also used to maintain the overall appearance. However, in order to facilitate understanding of a relative relationship and actuation of other elements in the casing 110, the casing 110 is omitted in FIG. 2, while a support plate 112 of the casing 110 is retained in FIG. 3, and the remaining portions are omitted. Based on other requirements, the casing 110 may include portions corresponding to other requirements not shown.

The first strap 120 has a first terminal 122 and a first connecting section 124. The second strap 130 has a second terminal 132 and a second connecting section 134. The first terminal 122 and the second terminal 132 are respectively connected to two opposite sides of the host 52. The first connecting section 124 and the second connecting section 134 are at least partially overlapped and accommodated in the casing 110. A length of an overlapping portion of the first connecting section 124 and the second connecting section 134 is adjustable, and the adjustment of the length of the overlapping portion depends on a head size of the user, so that the host 52 may be comfortably fixed on a head of the user.

The support plate 112 of the casing 110 has a first slide rail 112A and a second slide rail 112B, as shown in FIG. 3. The first speaker module 140 is slidably disposed on the first slide rail 112A. The second speaker module 150 is slidably disposed on the second slide rail 112B. That is, a sliding stroke of the first speaker module 140 is restricted by the first slide rail 112A, and a sliding stroke of the second speaker module 150 is restricted by the second slide rail 112B.

The first connecting section 124 has a first magnetic portion 124A. The second connecting section 134 has a second magnetic portion 134A (marked in FIG. 2). The first speaker module 140 has a third magnetic portion 142. The second speaker module 150 has a fourth magnetic portion 152. When the first connecting section 124 and the second connecting section 134 slide in the casing 110, the first magnetic portion 124A magnetically attracts the third magnetic portion 142 to drive the first speaker module 140 to slide on the first slide rail 112A, and the second magnetic portion 134A magnetically attracts the fourth magnetic portion 152 to drive the second speaker module 150 to slide on the second slide rail 112B. Since the magnetic force is used as the driving force, the first strap 120 is not required to be in physical contact with the first speaker module 140, and the second strap 130 is also not required to be in physical contact with the second speaker module 150. In this way, not only may it avoid wear caused by contact, but it may also reduce abnormal noise that may be generated during movement.

Figure 4:
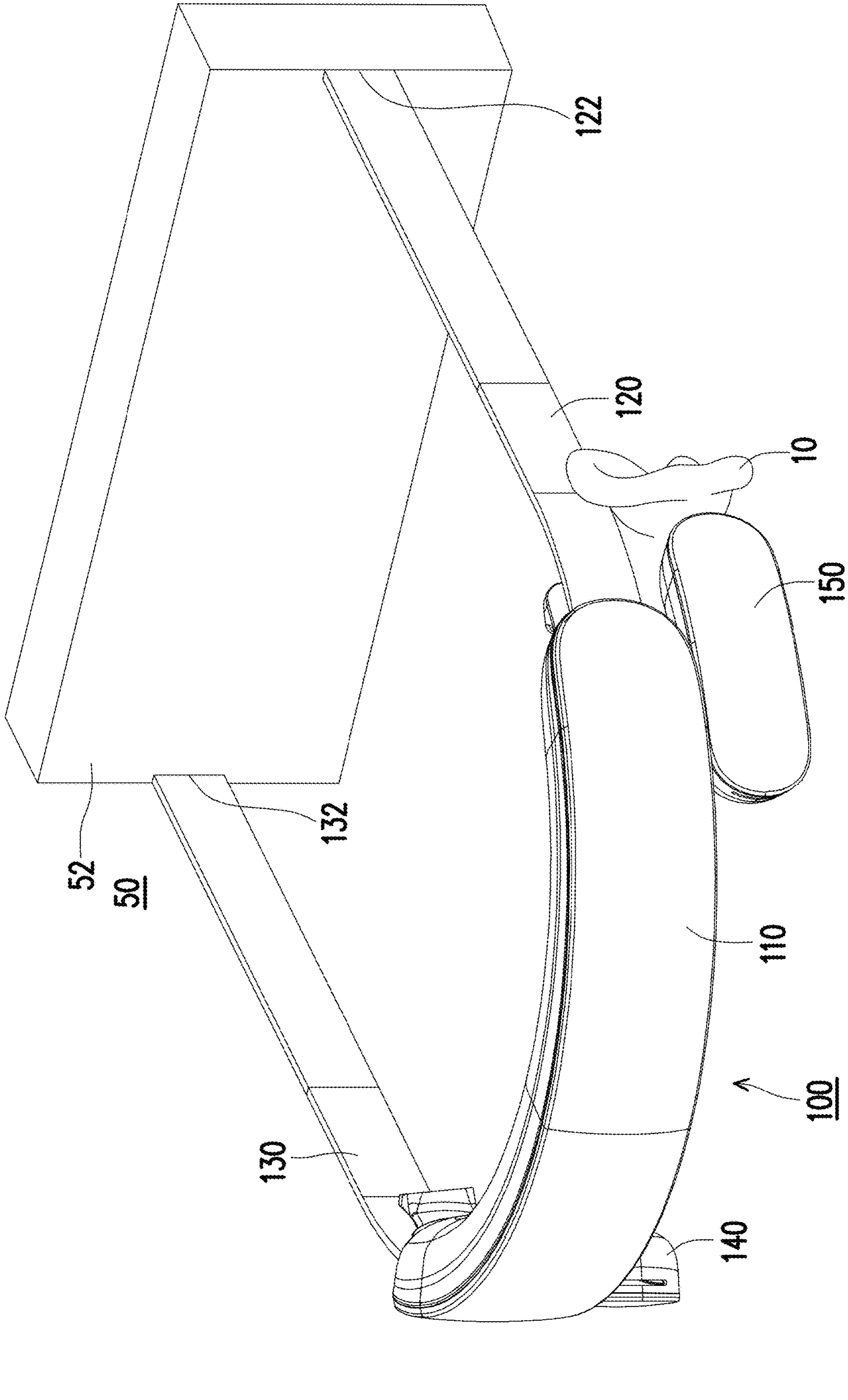
FIG. 4 is a schematic view of the strap module of the head mounted display device in FIG. 1 after a length thereof is shortened.
Figure 5:
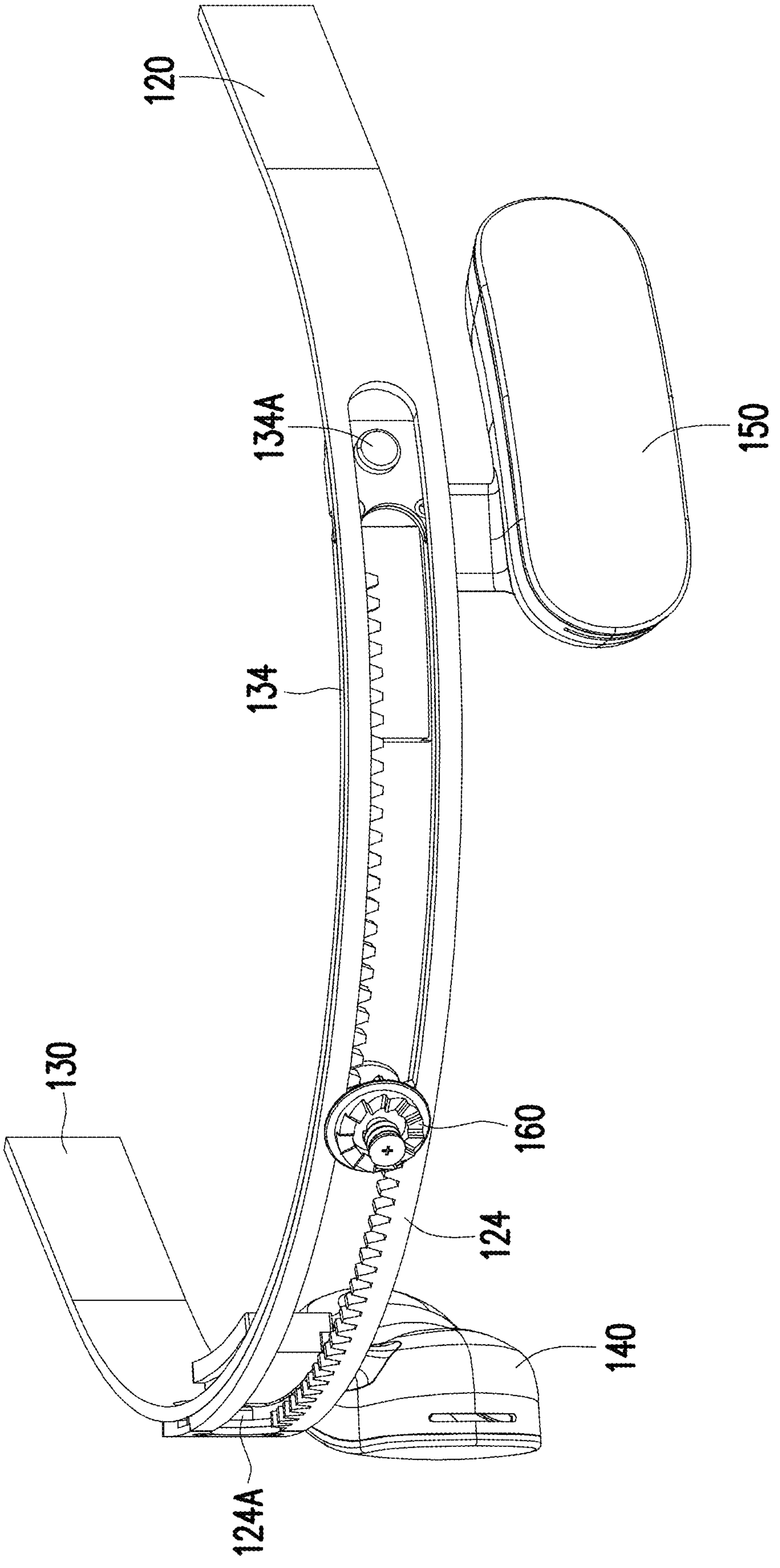
FIG. 5 is a schematic view of some elements of the strap module of the head mounted display device in FIG. 4.
Figure 6:
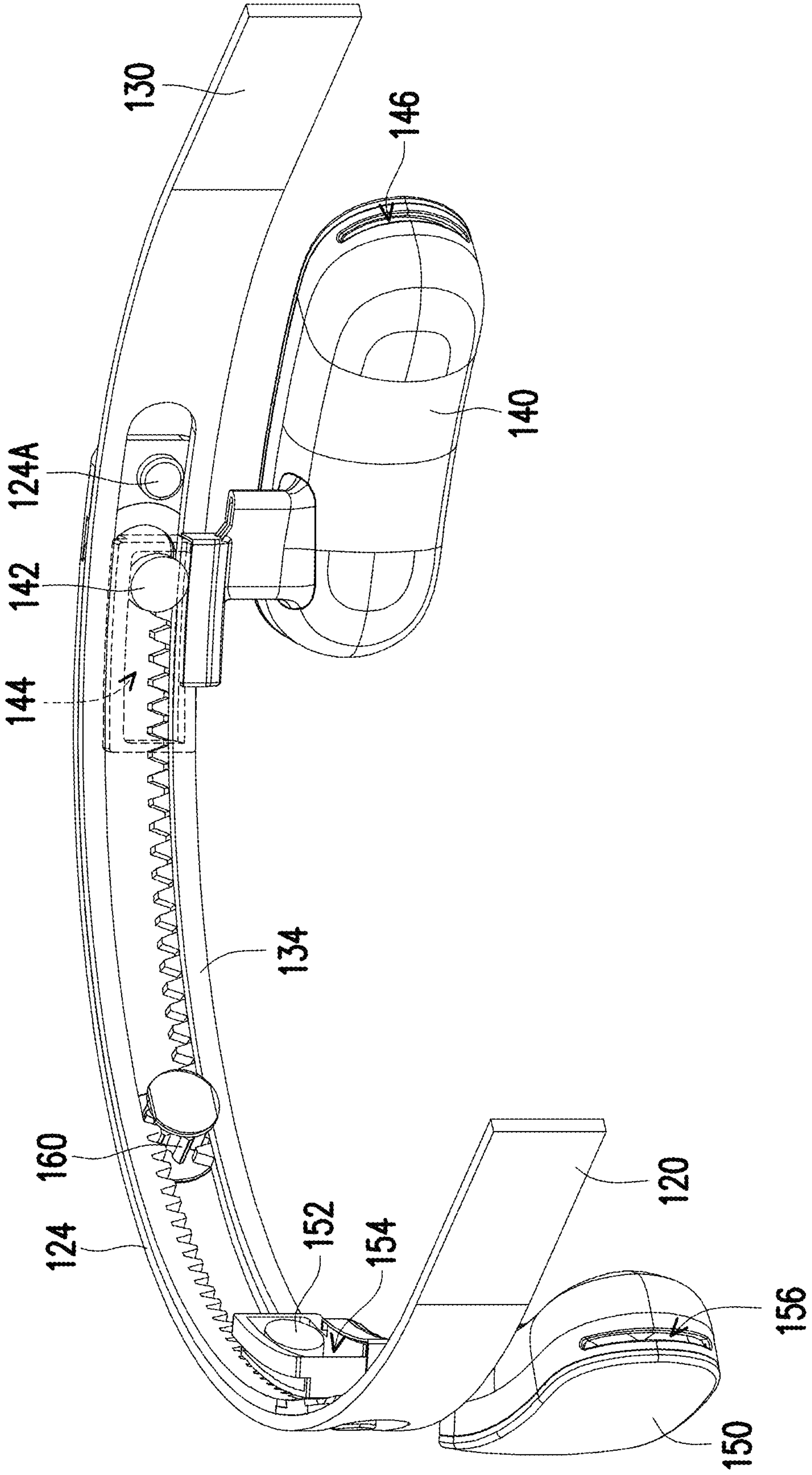
FIG. 6 is a schematic view of the strap module in FIG. 5 from another perspective.

FIG. 4 is a schematic view of the strap module of the head mounted display device in FIG. 1 after a length thereof is shortened. FIG. 5 is a schematic view of some elements of the strap module of the head mounted display device in FIG. 4. FIG. 6 is a schematic view of the strap module in FIG. 5 from another perspective. Referring to FIGS. 4 to 6, in the head mounted display device 50 and the strap module 100 thereof in this embodiment, while the user adjusts the length of the strap module to wear the head mounted display device 50, the first speaker module 140 and the second speaker module 150 are also driven by the magnetic force and move from a position close to a hind brain toward an ear 10. Therefore, when the user puts on the head mounted display device 50, the first speaker module 140 and the second speaker module 150 have also been pressed against the ear 10 of the user, and there is no need to adjust positions of the first speaker module 140 and the second speaker module 150 separately.

In this embodiment, the first magnetic portion 124A and the second magnetic portion 134A are magnets, and the third magnetic portion 142 and the fourth magnetic portion 152 are also magnets. However, in other embodiments, only one of the two corresponding magnetic portions may be the magnet, and the other magnetic portion may only be formed by a material that may be attracted by the magnet.

In this embodiment, the first speaker module 140 has an accommodating groove 144. The third magnetic portion 142 is movably accommodated in the accommodating groove 144. The second speaker module 150 has an accommodating groove 154. The fourth magnetic portion 152 is movably accommodated in the accommodating groove 154. As a state shown in FIGS. 2 and 3, the length of the overlapping portion of the first connecting section 124 and the second connecting section 134 is almost the minimum. The accommodating groove 144 of the first speaker module 140 is located at a terminal of the first slide rail 112A close to the hind brain, and a position of the first magnetic portion 124A corresponds to a position of the third magnetic portion 142 located on one side of the accommodating groove 144. The accommodating groove 154 of the second speaker module 150 is located at a terminal of the second slide rail 112B close to the hind brain, and a position of the second magnetic portion 134A corresponds to a position of the fourth magnetic portion 152 located on one side of the accommodating groove 154.

When the length of the strap module 100 is adjusted to change from the state shown in FIGS. 2 and 3 to a state shown in FIGS. 5 and 6, the movement of the first magnetic portion 124A first drives the movement of the third magnetic portion 142 in the accommodating groove 144. In other words, during the movement in this stage, due to the effect of the magnetic force, the positions of the first magnetic portion 124A and the third magnetic portion 142 remain overlapping. When the third magnetic portion 142 continues to move to another side of the accommodating groove 144, the continued movement of the first magnetic portion 124A has the effect of driving the first speaker module 140 to move through the third magnetic portion 142. When the first speaker module 140 continues to move to another terminal of the first slide rail 112A close to the ear 10, if the first magnetic portion 124A continues to move in a direction close to the host 52, that is, the overlapping portion of the first connecting section 124 and the second connecting section 134 continues to increase, the first speaker module 140 is restricted by the first slide rail 112A and may not continue to move, but the magnetic attraction between the first magnetic portion 124A and the third magnetic portion 142 may restrict the first speaker module 140 from leaving the terminal of the first slide rail 112A close to the ear 10 to prevent the first speaker module 140 from moving arbitrarily. Therefore, even if the first speaker module 140 has reached the terminal of the first slide rail 112A close to the ear 10, the user may still adjust the strap module 100 and maintain the position of the first speaker module 140, so that the head mounted display device 50 is suitable for the user with a smaller head size. In other words, regardless of the head size, the first speaker module 140 may be adjusted to a position pressed against the ear 10 to provide the best sound effect. Similarly, the interaction between the second magnetic portion 134A and the second speaker module 150 is the same as the interaction between the first magnetic portion 124A and the first speaker module 140. Therefore, the detailed description is omitted.

Referring to FIG. 6 again, the accommodating groove 144 in this embodiment has a strip-shaped space, and the third magnetic portion 142 is movably accommodated in the accommodating groove 144. During a process of the first magnetic portion 124A moving from the position in FIG. 3 to the position in FIG. 6, for some users, before the accommodating groove 144 is pressed against the terminal of the first slide rail 112A, the first speaker module 140 may have been pressed against a left ear of the user, and the length of the entire strap module 100 may have been adjusted to the optimum. However, for other users, when the first speaker module 140 has been pressed against the left ear of the user, the length of the entire strap module 100 has not been adjusted to the optimum, and the first magnetic portion 124A is required to continue to move to the position in FIG. 6. Since the third magnetic portion 142 is movably accommodated in the accommodating groove 144, the third magnetic portion 142 may be driven by the magnetic force to continue to move from a left side of the accommodating groove 144 to a right side of the accommodating groove 144 in FIG. 6. Until the first magnetic portion 124A moves to an appropriate position with the first strap 120, the length of the strap module 100 is adjusted to stabilize the host 52 on the head of the user. In this way, although a relative position of the ears on the head and the head size of each of the users are different, the movable space provided by the accommodating groove 144 for the third magnetic portion 142 may still overcome the aforementioned personal size differences, so that the first speaker module 140 may be pulled by the magnetic attraction force of the first magnetic portion 124A to be firmly pressed against the left ear of the user. Similarly, the fourth magnetic portion 152 is also movably accommodated in the accommodating groove 154. Even if there are the aforementioned personal size differences, the second speaker module 150 may still be pulled by the magnetic attraction force of the second magnetic portion 134A to be firmly pressed against the left ear of the user.

In this embodiment, the strap module 100 further includes a coupling member 160, which is rotatably disposed on the casing 110 and is coupled to both the first connecting section 124 and the second connecting section 134. A relative position between the coupling member 160 and the casing 110 is fixed, so a relative position between the casing 110 and the first strap 120 and the second strap 130 may be fixed. In addition, when the rotation of the coupling member 160 is designed to be lockable, the length of the overlapping portion of the first connecting section 124 and the second connecting section 134 may also be fixed.

In this embodiment, the first speaker module 140 and the second speaker module 150 are used to be pressed against a back of the ear 10 of the user. The first speaker module 140 and the second speaker module 150 have, for example, sound output holes 146 and 156 on one side facing the ear 10, so that the ear 10 may hear the sound transmitted from the sound output holes 146 and 156.

Figure 7:
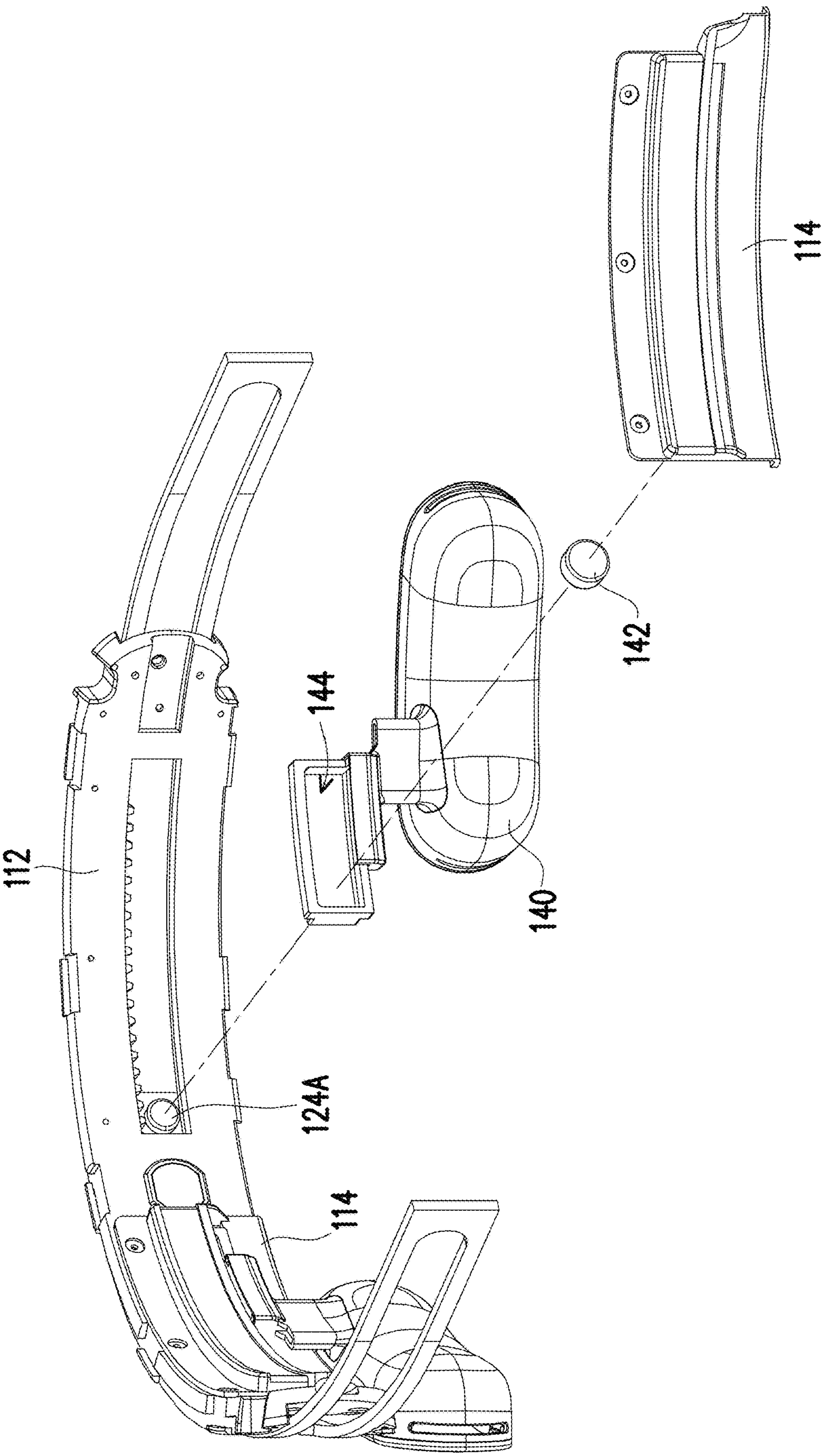
FIG. 7 is a schematic view of assembly of the strap module in FIG. 3 with an added cover plate.
Figure 8:
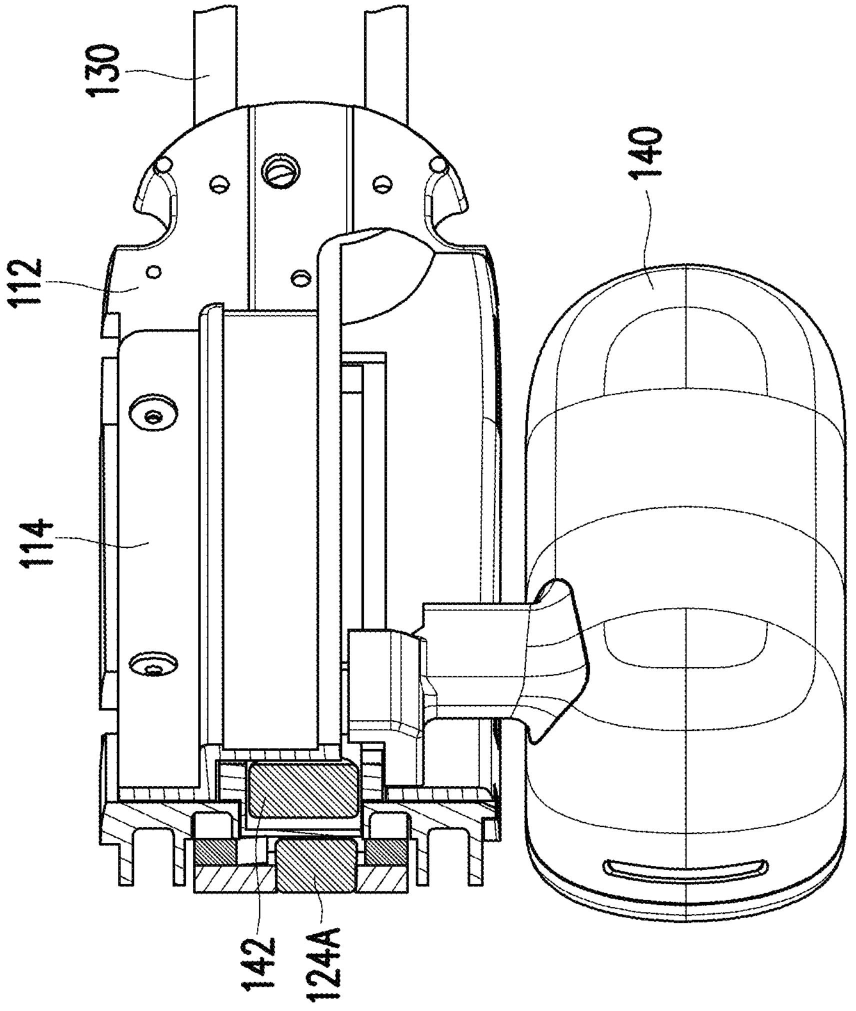
FIG. 8 is a partial cross-sectional view of the strap module in FIG. 7 after assembly.

FIG. 7 is a schematic view of assembly of the strap module in FIG. 3 with an added cover plate. FIG. 8 is a partial cross-sectional view of the strap module in FIG. 7 after assembly. Referring to FIGS. 7 and 8, in the head mounted display device 50 and the strap module 100 thereof in this embodiment, the casing 110 may further include two cover plates 114, and the third magnetic portion 142 is placed behind the accommodating groove 144 of the first speaker module 140. The cover plate 114 is adapted to be assembled to the support plate 112. A portion of the first speaker module 140 with the accommodating groove 144 is sandwiched between the cover plate 114 and the support plate 112, and the first speaker module 140 may slide between the cover plate 114 and the support plate 112. Another cover plate 114 is also adapted to be assembled to the support plate 112. A portion of the second speaker module 150 with the accommodating groove 154 is sandwiched between the cover plate 114 and the support plate 112, and the second speaker module 150 may slide between the cover plate 114 and support plate 112. According to FIG. 8, the third magnetic portion 142 located in the accommodating groove 144 may correspondingly magnetically attract the first magnetic portion 124A, and the second magnetic portion 134A in FIG. 2 may also magnetically attract the fourth magnetic portion 152 in FIG. 3.

Based on the above, in the head mounted display device and the strap module thereof in the disclosure, while the length of the strap module is adjusted, the speaker module is also driven by the magnetic force and may naturally pressed against the ears of the user, which is more convenient and does not require additional adjustments.

What is claimed is:

1. A head mounted display device, comprising:

a host;

a strap module, comprising;

a casing having a first slide rail and a second slide rail;

a first strap having a first terminal and a first connecting section;

a second strap having a second terminal and a second connecting section, wherein the first terminal and the second terminal are respectively connected to two opposite sides of the host, and the first connecting section and the second connecting section are at least partially overlapped and accommodated in the casing;

a first speaker module slidably disposed on the first slide rail; and a second speaker module slidably disposed on the second slide rail, wherein the first connecting section has a first magnetic portion, the second connecting section has a second magnetic portion, the first speaker module has a third magnetic portion, the second speaker module has a fourth magnetic portion, and when the first connecting section and the second connecting section slide in the casing, the first magnetic portion magnetically attracts the third magnetic portion to drive the first speaker module to slide on the first slide rail, and the second magnetic portion magnetically attracts the fourth magnetic portion to drive the second speaker module to slide on the second slide rail.

2. The head mounted display device according to claim 1, wherein the first magnetic portion and the second magnetic portion are magnets.

3. The head mounted display device according to claim 1, wherein the first speaker module has an accommodating groove, and the third magnetic portion is movably accommodated in the accommodating groove.

4. The head mounted display device according to claim 1, wherein the strap module further comprises a coupling member, rotatably disposed on the casing and coupled to both the first connecting section and the second connecting section.

5. The head mounted display device according to claim 1, wherein the first speaker module and the second speaker module are configured to be pressed against a back of an ear of a user.

6. A strap module, comprising:

a casing having a first slide rail and a second slide rail;

a first strap having a first terminal and a first connecting section;

a second strap having a second terminal and a second connecting section, wherein the first terminal and the second terminal are respectively connected to two opposite sides of a host, and the first connecting section and the second connecting section are at least partially overlapped and accommodated in the casing;

a first speaker module slidably disposed on the first slide rail; and a second speaker module slidably disposed on the second slide rail, wherein the first connecting section has a first magnetic portion, the second connecting section has a second magnetic portion, the first speaker module has a third magnetic portion, the second speaker module has a fourth magnetic portion, and when the first connecting section and the second connecting section slide in the casing, the first magnetic portion magnetically attracts the third magnetic portion to drive the first speaker module to slide on the first slide rail, and the second magnetic portion magnetically attracts the fourth magnetic portion to drive the second speaker module to slide on the second slide rail.

7. The strap module according to claim 6, wherein the first magnetic portion and the second magnetic portion are magnets.

8. The strap module according to claim 6, wherein the first speaker module has an accommodating groove, and the third magnetic portion is movably accommodated in the accommodating groove.

9. The strap module according to claim 6, further comprising a coupling member, rotatably disposed on the casing and coupled to both the first connecting section and the second connecting section.

10. The strap module according to claim 6, wherein the first speaker module and the second speaker module are configured to be pressed against a back of an ear of a user.

* * * * *